(12) United States Patent
Jones, Jr.

(10) Patent No.: US 10,183,714 B2
(45) Date of Patent: Jan. 22, 2019

(54) MOTORCYCLE CONTROL PADS

(71) Applicant: James Lee Jones, Jr., Watsonville, CA (US)

(72) Inventor: James Lee Jones, Jr., Watsonville, CA (US)

(73) Assignee: MX Control Tech, Watsonville, CA (US)

( * ) Notice: Subject to any disclaimer, the term of this patent is extended or adjusted under 35 U.S.C. 154(b) by 24 days.

(21) Appl. No.: 15/370,067

(22) Filed: Dec. 6, 2016

(65) Prior Publication Data

US 2017/0101146 A1 Apr. 13, 2017

Related U.S. Application Data

(63) Continuation-in-part of application No. 14/805,270, filed on Jul. 21, 2015, now Pat. No. 9,511,808.

(51) Int. Cl.
| | |
|---|---|
| *B62J 1/02* | (2006.01) |
| *A41D 1/084* | (2018.01) |
| *A43B 5/14* | (2006.01) |
| *A43C 15/00* | (2006.01) |
| *B62J 1/00* | (2006.01) |
| *B62K 11/02* | (2006.01) |
| *B62J 25/00* | (2006.01) |
| *B62K 11/04* | (2006.01) |

(52) U.S. Cl.
CPC .............. *B62J 1/02* (2013.01); *A41D 1/084* (2013.01); *A43B 5/145* (2013.01); *A43C 15/00* (2013.01); *B62J 1/002* (2013.01); *B62J 25/00* (2013.01); *B62K 11/02* (2013.01); *B62K 11/04* (2013.01); *A41D 2400/80* (2013.01); *A41D 2600/104* (2013.01); *B60Y 2200/12* (2013.01)

(58) Field of Classification Search
CPC .. B62J 1/02; B62J 1/002; A41D 1/084; A41D 2400/80; A41D 2600/14; A43B 5/145; A43C 15/00; B62K 11/02; B60Y 2200/12
USPC .......................................................... 280/283
See application file for complete search history.

(56) References Cited

U.S. PATENT DOCUMENTS

| | | | | |
|---|---|---|---|---|
| 3,901,549 A | * | 8/1975 | Ramirez | ................ B62J 17/065 296/78.1 |
| 5,080,431 A | * | 1/1992 | Frazier | ...................... B62J 1/20 297/184.11 |

(Continued)

*Primary Examiner* — Jacob D Knutson
(74) *Attorney, Agent, or Firm* — Donald R. Boys; Central Coast Patent Agency LLC

(57) ABSTRACT

A control pad system for a motorcycle has a substantially U-shaped saddle-like unit having a horizontally-disposed upper portion adapted to engage a frame of a motorcycle beneath a seat of the motorcycle, with downward-extending first and second opposite side portions, disposed on each side of the motorcycle frame with the upper portion engaged to the motorcycle frame, and two control pads fashioned from resilient rubber-like material, each having a length, a height and a thickness, one each of the control pads mounted to each of the first and second opposite side portions, such that an outer surface of each control pad is presented outwardly from the motorcycle frame on each side portion. The control pads are positioned in a manner to enable the rider to grip the control pads between the knees, constraining the rider's position forward and rearward on the motorcycle.

8 Claims, 9 Drawing Sheets

(56) References Cited

U.S. PATENT DOCUMENTS

| | | | | |
|---|---|---|---|---|
| 7,367,577 B1* | 5/2008 | Garrett | .................... | B62J 21/00 |
| | | | | 280/288.4 |
| 7,556,292 B2* | 7/2009 | King | ........................ | B62J 17/06 |
| | | | | 150/167 |
| 9,511,808 B1* | 12/2016 | Jones, Jr. | ................ | B62K 11/02 |
| 2004/0021352 A1* | 2/2004 | Montone | .................... | B62J 1/12 |
| | | | | 297/219.11 |

\* cited by examiner

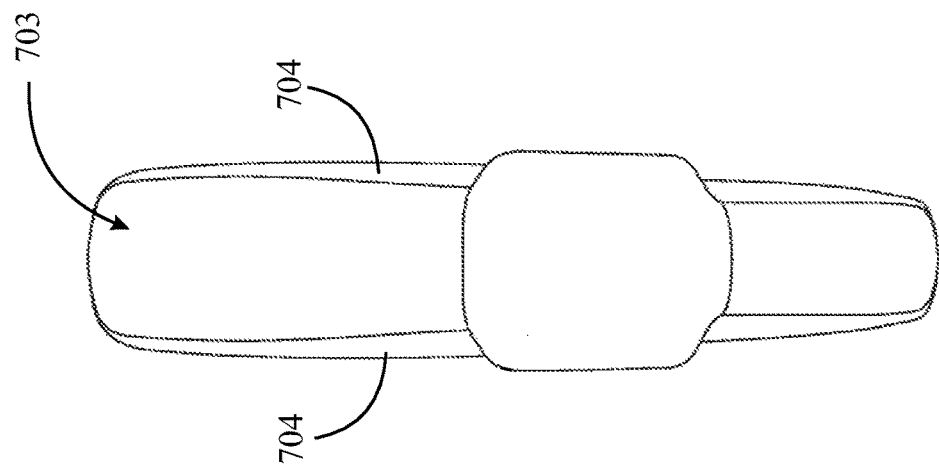
*Fig. 7c*
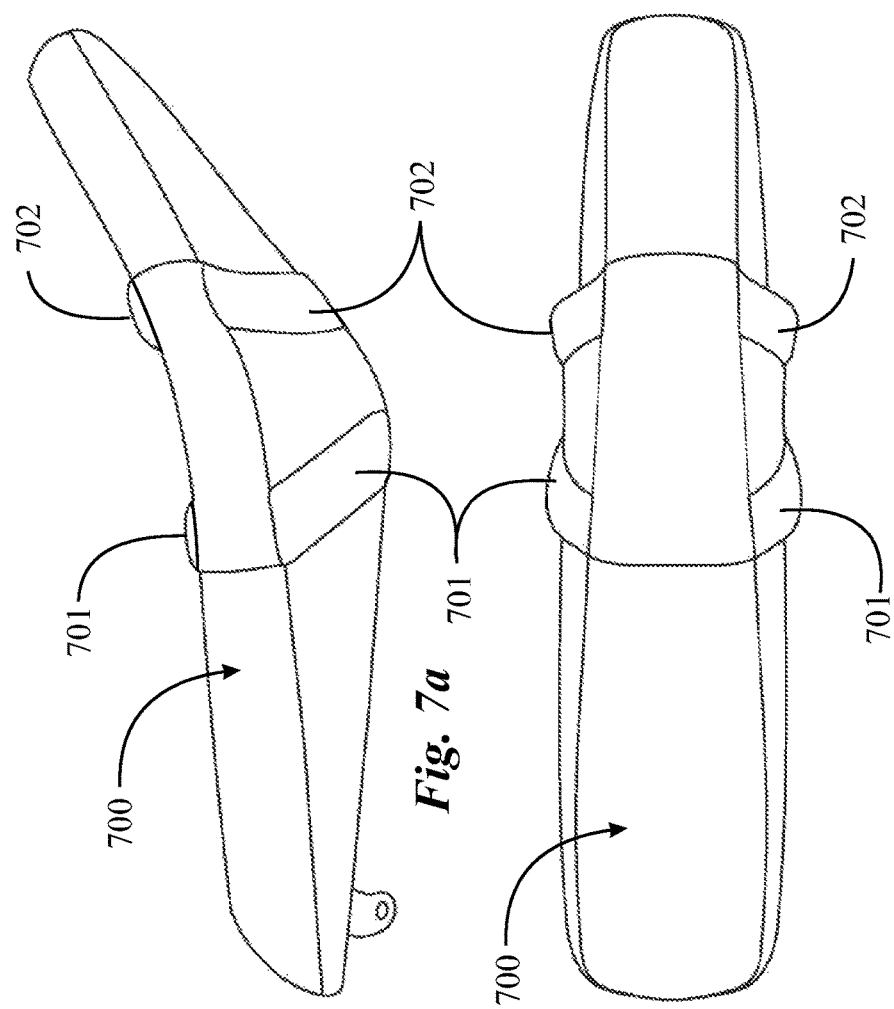
*Fig. 7a*  *Fig. 7b*

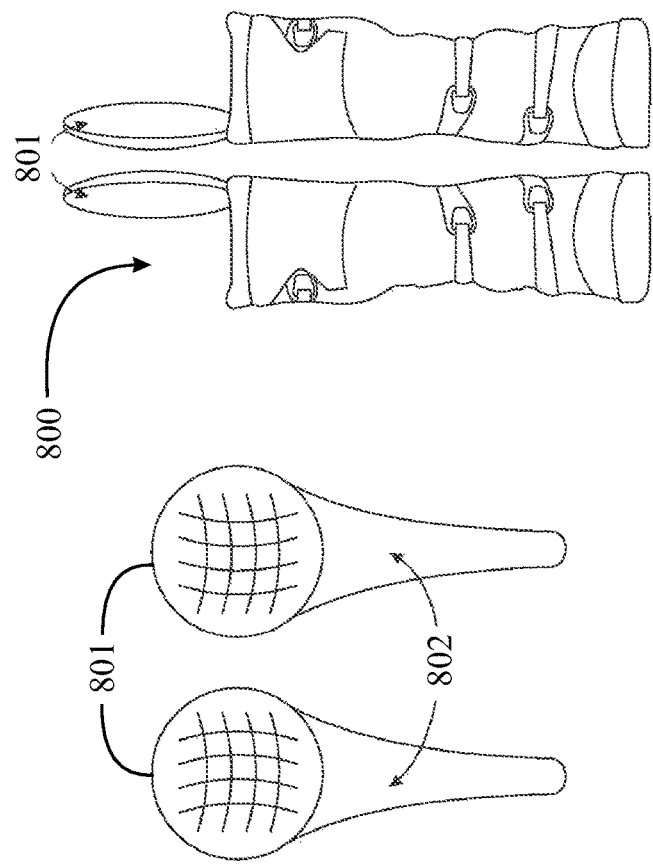
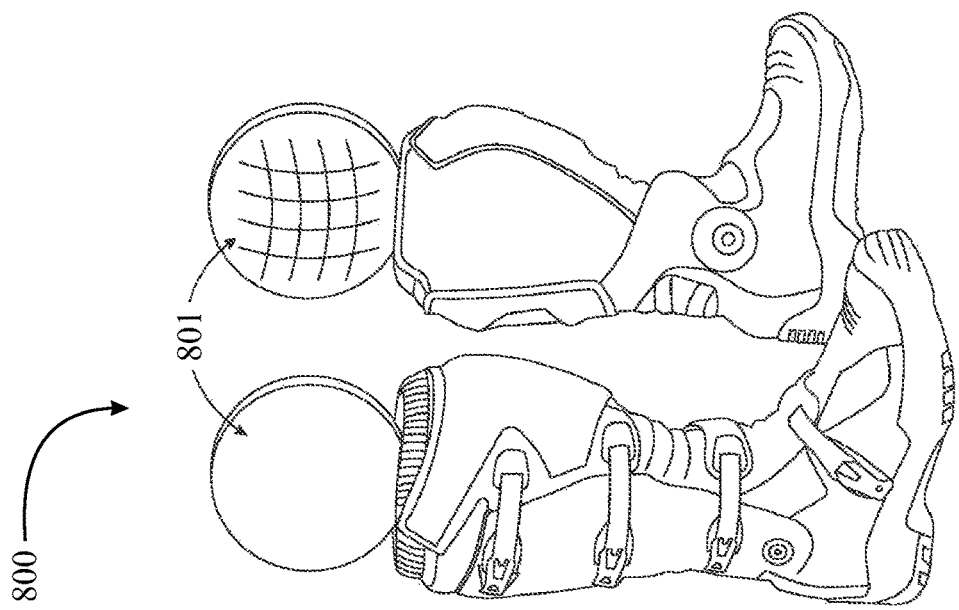
Fig. 8c
Fig. 8b
Fig. 8a

US 10,183,714 B2

MOTORCYCLE CONTROL PADS

CROSS-REFERENCE TO RELATED DOCUMENTS

The present application is continuation-in-part (CIP) of application Ser. No. 14/805,270, issued on Dec. 6, 2016 as U.S. Pat. No. 9,511,808, and all disclosure of the prior application is incorporated herein at least by reference.

BACKGROUND OF THE INVENTION

1. Field of the Invention

The invention is in the technical area of motorcycles, and applies more particularly to maintaining control of a motorcycle under conditions of acceleration and deceleration.

2. Description of Related Art

Traditionally, the only means of stabilizing and controlling a motorcycle are with the handlebars. Decelerating and accelerating riding conditions that go beyond casual experience require the rider to increasingly grip the handlebars with greater force to prevent the rider's body from going over the handlebars or from falling off the back of the motorcycle.

Under extreme riding conditions, the shifting weight of the average motorcycle rider is a force far too great for the hands and arms to securely manage the required pushing and pulling of the handlebars for stability. What is clearly needed is to provide a way for the rider to secure his or her weight to the motorcycle.

BRIEF SUMMARY OF THE INVENTION

In one embodiment of the invention a control pad system for a motorcycle is provided, comprising a substantially U-shaped saddle-like unit having a horizontally-disposed upper portion adapted to engage a frame of a motorcycle beneath a seat of the motorcycle, with downward-extending first and second opposite side portions, disposed on each side of the motorcycle frame with the upper portion engaged to the motorcycle frame, and two control pads fashioned from resilient rubber-like material, each having a length, a height and a thickness, one each of the control pads mounted to each of the first and second opposite side portions, such that an outer surface of each control pad is presented outwardly from the motorcycle frame on each side portion. The control pads are positioned in a manner to enable the rider to grip the control pads between the knees, constraining the rider's position forward and rearward on the motorcycle.

In one embodiment, the outer surfaces of the control pads present a non-slip surface. Also in one embodiment, the non-slip surface is an added layer to the outer surfaces of the control pads. Also in one embodiment, the added layer is mounted to the outer surfaces with an adhesive.

In one embodiment of the invention the thickness of the control pads is uniform. Also in one embodiment, the thickness of the control pads varies, being thicker in a forward and rearward region, and thinner in a central area. In one embodiment, the thickness of the control pads varies in a manner to present a depression in the shape of the inside of the rider's knees. And in one embodiment, the horizontally-disposed upper portion comprises one or more openings to accommodate fasteners to constrain the saddle-like unit to the motorcycle frame.

In another aspect of the invention a method is provided, comprising mounting a control pad having a length, a height and a thickness to an outside surface of each of two side portions extending downward from a substantially horizontally-disposed upper portion of a substantially U-shaped saddle-like unit, removing a seat from a motorcycle and mounting the substantially U-shaped saddle-like unit to a frame of the motor cycle, and replacing the seat on the motorcycle over the saddle-like unit. The control pads are presented outwardly from the motorcycle frame in a position enabling a rider of the motorcycle to grip the control pads between the knees.

In one embodiment of the method the outer surfaces of the control pads present a non-slip surface. Also in one embodiment, the non-slip surface is an added layer to the outer surfaces of the control pads. Also in one embodiment, the added layer is mounted to the outer surfaces with an adhesive. In one embodiment, the thickness of the control pads is uniform.

In one embodiment of the method the thickness of the control pads varies, being thicker in a forward and rearward region, and thinner in a central area. Also in one embodiment, the thickness of the control pads varies in a manner to present a depression in the shape of the inside of the rider's knees. And in one embodiment the horizontally-disposed upper portion comprises one or more openings to accommodate

BRIEF DESCRIPTION OF THE SEVERAL VIEWS OF THE DRAWINGS

FIG. 7a is a perspective view of a motorcycle seat in an alternative embodiment of the invention.

FIG. 7b is a top plan view of the motorcycle seat of FIG. 7a.

FIG. 7c is a top plan view of a motorcycle seat in another embodiment of the invention.

FIG. 8a is a perspective view of a pair of motorcycle riding boots in an embodiment of the invention in another alternative embodiment of the invention.

FIG. 8b is a front view of a set of control pads useful with the boots of FIG. 8.

FIG. 8c is a front view of the boots of FIG. 8a with control pads added in an embodiment of the invention.

DETAILED DESCRIPTION OF THE INVENTION

Figure 1:
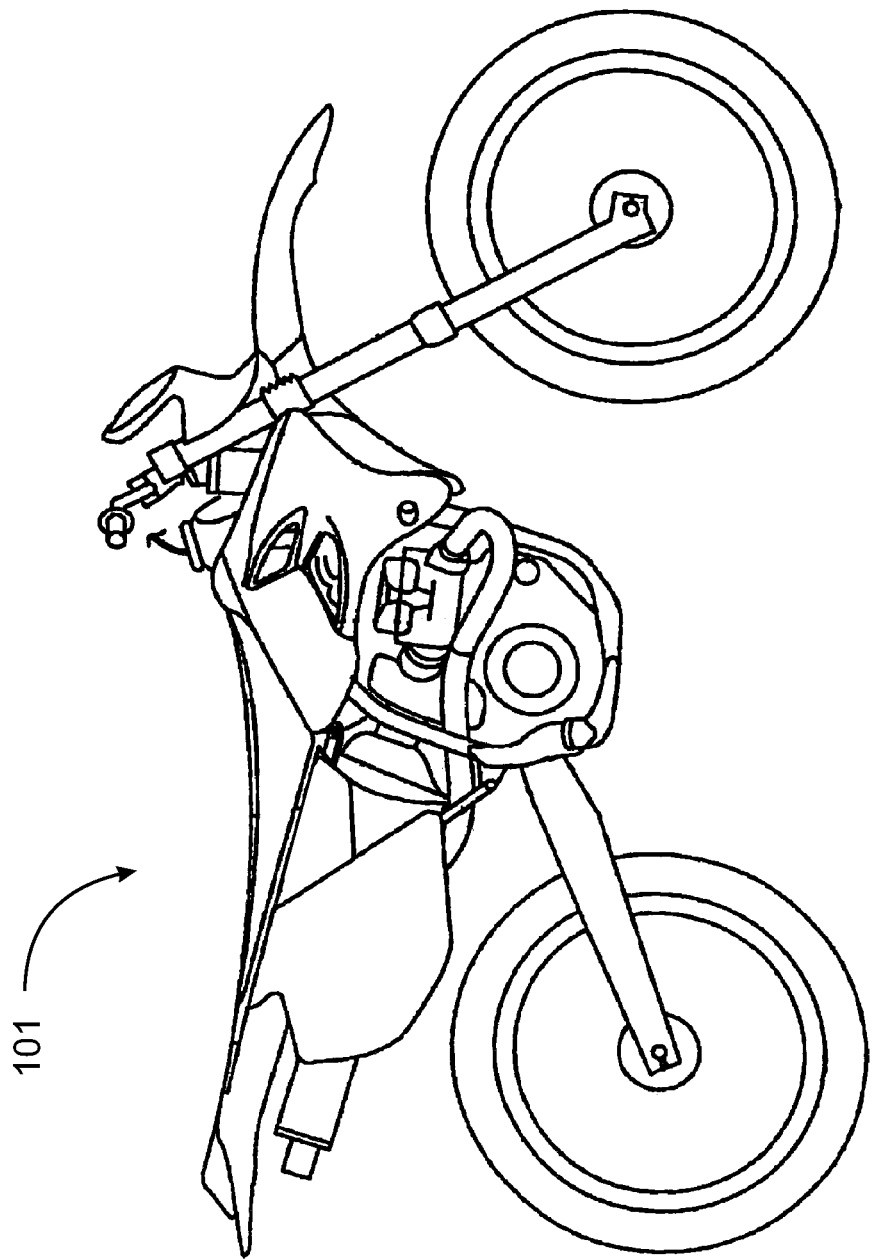
FIG. 1 is a side elevation view of a motorcycle in the prior art.

In one embodiment of the invention control-pads are placed onto a motorcycle, or made available to a rider in another manner, to enable the rider to grip the motorcycle with his or her knees and legs to absorb forces produced by acceleration and deceleration, shifting management of these forces from the rider's hands and upper body in association with the handle-grips and handlebars of the motorcycle. This unique arrangement of elements greatly increases ability of the rider to position and maintain weight to a desired position for optimum control and safety. In some embodiments of the invention the rider is enabled to easily move the legs out, around and return into the control-pads while moving in and out of a seated position and while traversing terrain requiring a full range of technical ridding techniques.

Elements in embodiments of the invention can attach to the motorcycle in a variety of different ways:
1) In one embodiment, the control-pads are part of the motorcycle seat and seat cover, so that the control-pads are a contiguous functioning parts of the motorcycle seat, with a pair of control-pads on both the left and the right side of the seat. The control-pad seat may be custom made for each type, make, model and year of motorcycle. Alternatively, a control-pad seat may be an aftermarket product. Control-pad positions on such a seat may be adjustable, replaceable and may vary in shape, size, color and type of material.
2) In a second embodiment, the control-pads may be a single unit that fits between the motorcycle seat and motorcycle frame, similar to a saddle on a horse. The control pads are securely locked into place when the motorcycle seat is re-mounted onto the motorcycle frame in the way it was originally designed to attach. The control-pad positions are adjustable, replaceable and vary in shape, size, color and type of material.
3) In a third embodiment, the control-pads are two separate units with two control-pads per unit. Each unit is retrofitted onto one side of a stock motorcycle seat. The control-pad positions are adjustable, replaceable and vary in shape, size, color and type of material.
4) In a fourth embodiment, each control-pad is a separate unit that is attached directly to the motorcycle with two pads on the left side and two pads on the right side of the motorcycle. The positions of each control-pad are adjustable, replaceable and vary in shape, size, color and type of material.

It is to be understood that the four alternatives mentioned above do not limit embodiments of the invention to these four options.

In various embodiments, the motorcycle control-pads are ideally mounted and secured in a location on the motorcycle for optimal body weight movement and distribution while the rider is crouching or standing. The control pads may be made of rubber-like material that is hard and dense enough to absorb sudden and gradual forces from the forward and backward movement of the rider's knees, including kinetic energy and weight of the rider, yet soft enough to provide comfort to the knees and legs of the rider as they move in, out, around and back into position with the control-pads.

In various embodiments, there are two control-pads mounted on each side of the motorcycle, which prevent each knee and leg from sliding forward and backward. In this particular embodiment, a forward pad on each side may be an elongated bar against which the front of the rider's knees may bear. A rearward pad on each side may be a round, puck-like extension which may engage with the back of the rider's knee.

In various embodiments, the control-pads may be composed of any type of material that may satisfy the needs of the rider. Also in various embodiments, the control-pads can take on any shape and size that may satisfy the needs of the rider.

In various embodiments, the control-pads may take on any position that may satisfy the needs of the rider to keep the knees from sliding too far forward and backward. Generally, per each side of the motorcycle, one control-pad is positioned at the front of the knee as the rider is standing up on the motorcycle foot pegs and the other control-pad is position behind the knee near the rider's upper calf area.

FIG. 1 is a side elevation view of a motorcycle 101 in the prior art, the motorcycle of a sort that might benefit from use of different embodiments of the present invention.

Figure 2A:
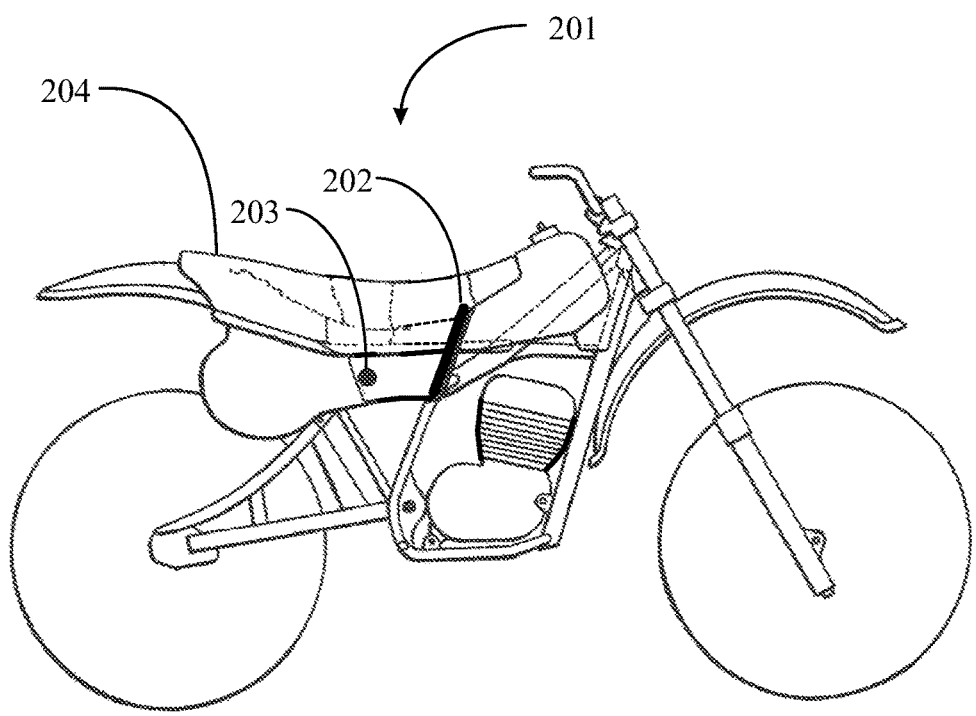
FIG. 2a is a side elevation view of a motorcycle in an embodiment of the invention.

FIG. 2a is a side elevation view of a different motorcycle 201 than that of FIG. 1, motorcycle 201 having a seat 204 and elongated forward bars 202, and rearward-mounted pucks 203, to engage a rider's legs in an embodiment of the invention. Only the bar and puck on the one side may be seen in FIG. 2a. In this embodiment, the bar and puck, also referred to herein as control pads, may be mounted to the motorcycle frame below seat 204.

Figure 2B:
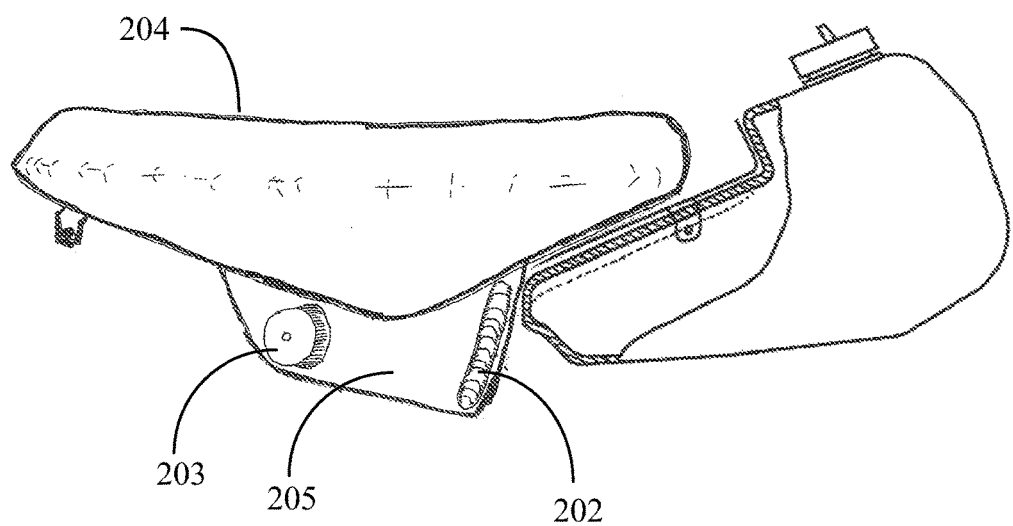
FIG. 2b is an enlarged view of the seat area and elements of the motorcycle of FIG. 2a in an embodiment of the invention.

FIG. 2b illustrates an embodiment of the invention in which the forward bar 202 and the rearward puck 203 are mounted to a portion 205 of seat 204 that extends down on each side of the motorcycle. In this embodiment, the control pads are designed as part of the motorcycle seat and seat cover, so that the control-pads are a contiguous functioning part of the motorcycle seat with a pair of control pads 202 & 203 on the left and right side of the seat. In some cases portion 205 may be a portion that is added to and fastened to a motorcycle seat 204 on each side, or portion 205 may be a contiguous part of the motorcycle seat. The control-pad seat may be custom made for each type, model and year of motorcycle. The control-pad positions are adjustable, replaceable, vary in shapes, sizes, colors and type of material with a variety of density and friction properties.

Figure 3:
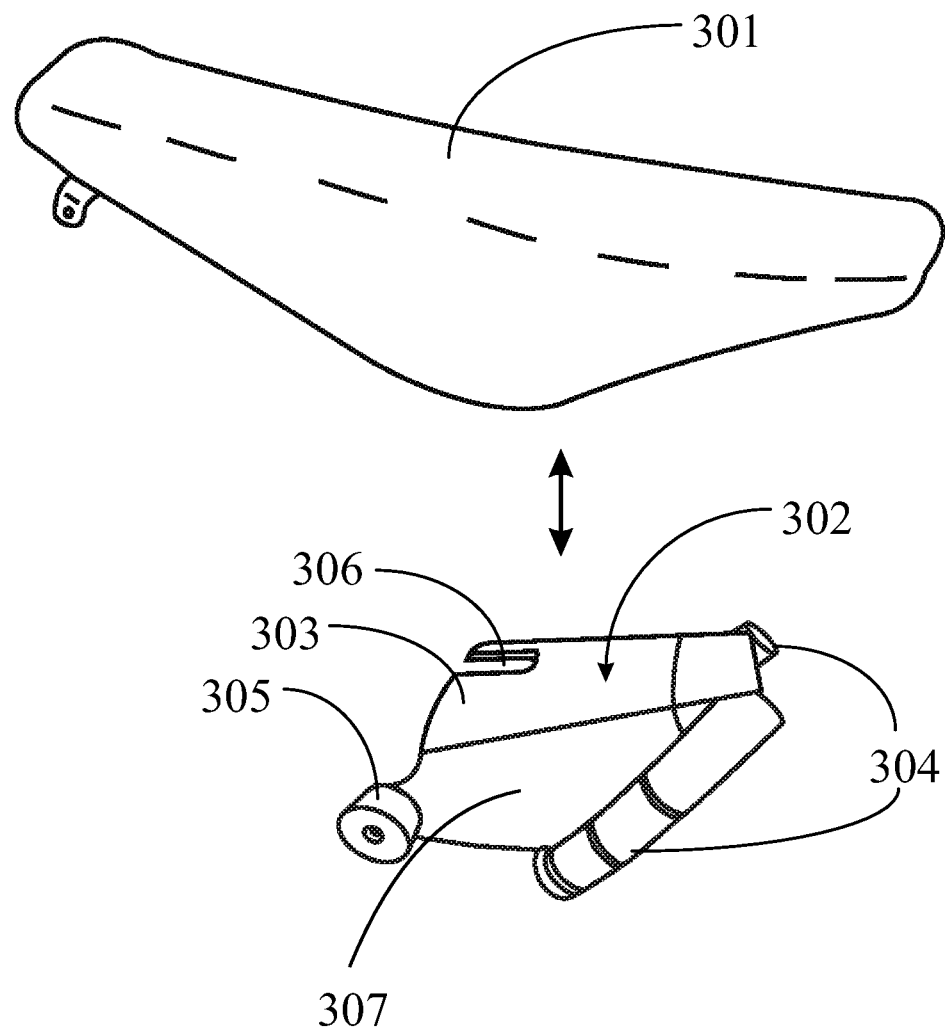
FIG. 3 illustrates a saddle structure 302 with control pads in an embodiment of the invention.

FIG. 3 illustrates a saddle structure 302 with control pads 304 and 305, analogous to the bar 202 and puck 203 elements illustrated in FIG. 2b, mounted on opposite sides of the saddle structure. Saddle structure 302 has atop surface 303 and side surfaces 307, and a relieved area 306 which may be used for mounting the saddle structure to a motorcycle frame. The shape and elements of such a saddle structure may vary for use with different makes and models of motorcycles. In use, seat 301 is removed from a motorcycle, saddle structure 302 is mounted to the frame, and then seat 301 is remounted to the frame over the saddle structure. The control-pad positions may be adjustable, replaceable and may vary in shape, size, color and type of material. Control pads 304 are in the forward position preventing the rider's knees from moving forward. Control pads 305 are in the reward position preventing the rider's knees from moving backward.

Figure 4A:
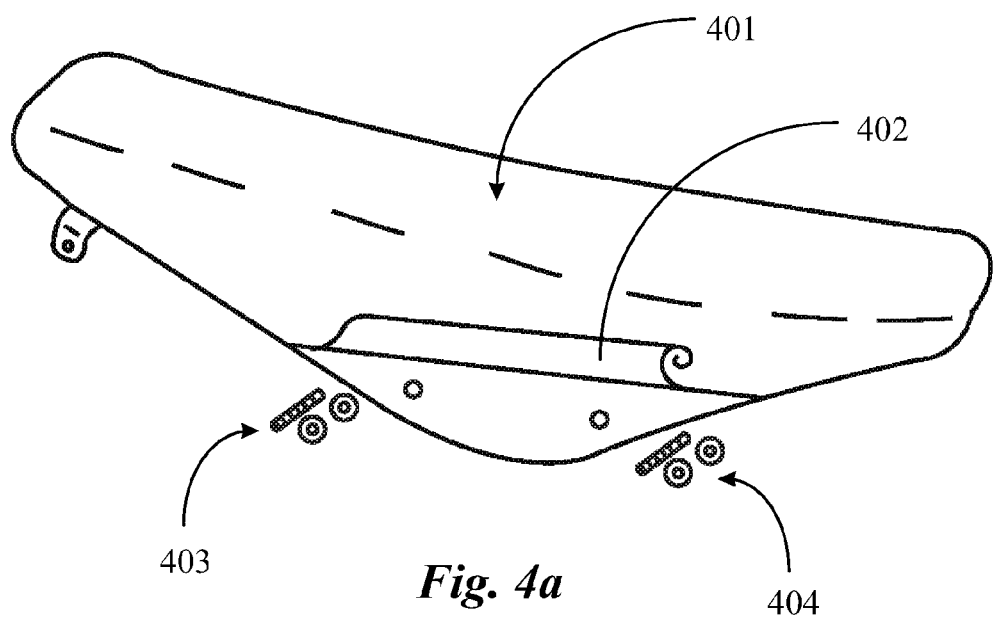
FIG. 4a is a side elevation view of a motorcycle seat with the front pointed to right showing a means to attach the embodiment of FIG. 4b of present invention.
Figure 4B:
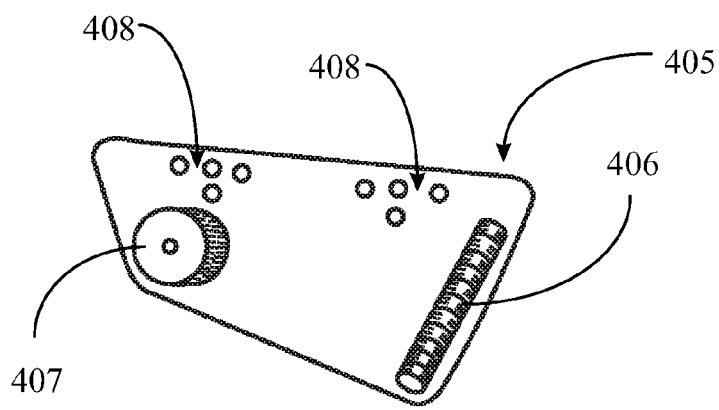
FIG. 4b is embodiment of the invention as it would mount to the motorcycle seat.

FIGS. 4a and 4b illustrate control pads integrated with a motorcycle in another embodiment of the invention. In this embodiment upholstery of a motorcycle seat 401 is peeled up as shown at 402, exposing a metal from below the upholstery. This is done on both sides of the seat, although only one side is shown in the figure. Holes are made through the metal frame as shown below the rolled-up portion of upholstery.

Control pads 406 & 407 are mounted to a panel 405, which has two sets of holes 408 for facilitating mounting to the seat metal frame of the seat. Panel 405 is mounted to the holes in the metal frame of the seat using conventional fasteners 403 and 404. A mirror image panel with control pads is mounted to the seat frame on the opposite side not show. Then the upholstery is rolled down and secured, such as with an adhesive. The pattern of holes seen as 408 on panel 405 allows the position of the panel to be varied relative to the seat. The control-pad positions are adjustable, replaceable and vary in shape, size, color and type of material.

Figure 5:
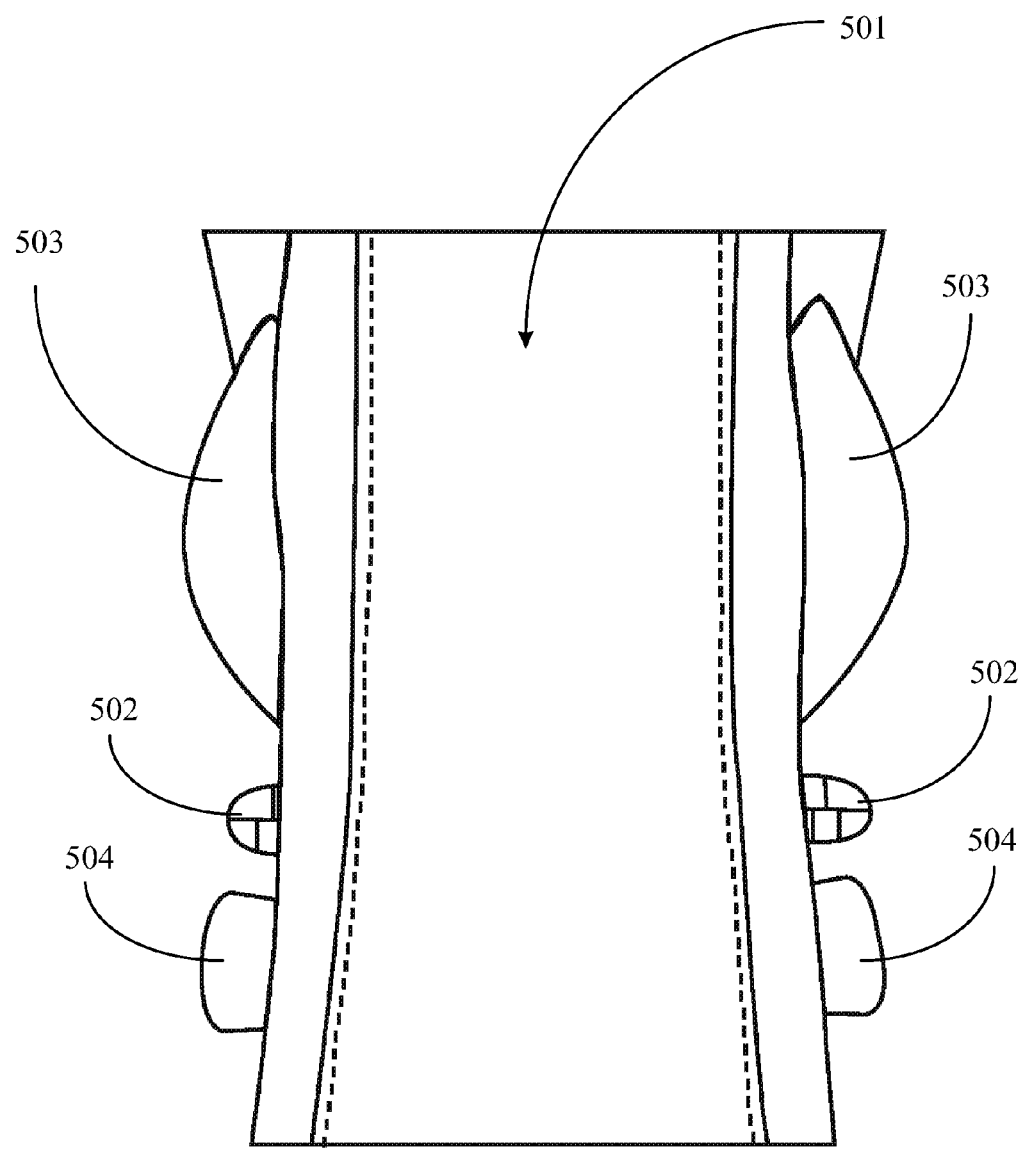
FIG. 5 is a top-down view of the motorcycle seat facing forward, showing elements unique to an embodiment of the invention.

FIG. 5 is a view from above of a motorcycle with a seat 501. Control-pads 503 and 504 in one embodiment are an integral part of the seat, one set on each side, and extend horizontally, such that a rider with feet on foot pegs 502 will have his or her legs on each side of the seat between forward pad 503 and rearward pad 504 in a manner that the rider's legs will be constrained between the pads, which may allow the rider to exert force on the pads by the rider's legs to control the rider's motion forward or backward on the seat, which may allow the rider to exert less force on the handlebar mechanism than would be necessary in the absence of the control-pads. The plan view of FIG. 5 illustrates control pads as an integral part of the seat, but also the embodiments of FIGS. 2a and 2b, 3a and 3b, and 4a and 4b.

Figure 6:
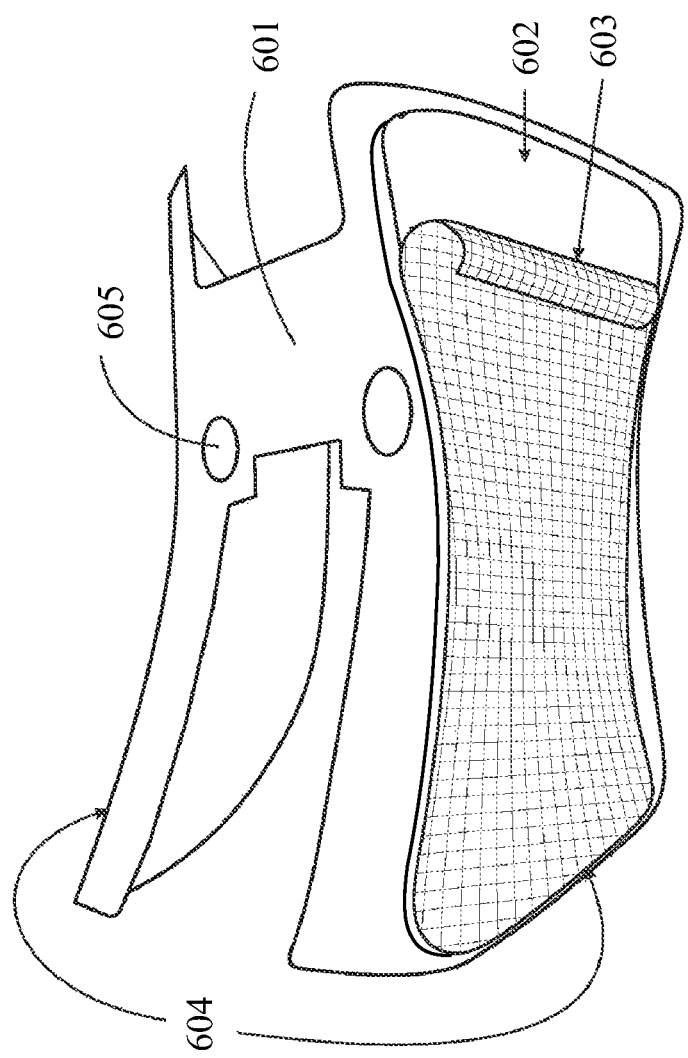
FIG. 6 is a perspective view of a saddle implementation with control pads in an embodiment of the invention.

FIG. 6 is a perspective view of a saddle, similar to the saddle embodiment illustrated in FIG. 3. The saddle of FIG. 6 differs in that there are no separate control pads mounted to the saddle as shown in FIG. 3. In the embodiment illustrated in FIG. 6 saddle 601 has lengthwise pads 602, one mounted on each side of saddle 601. Pads 602 are molded or cut from rubber-like or foam material of a density such that a rider may grip the pads with the inside of the knees, indenting the pads so the rider's legs will be restrained in forward or backward movement. The pads may vary in different embodiments in thickness from about one-quarter inch to perhaps three-quarters of an inch, or in some cases somewhat greater. The saddle mounts under the seat, just as in the embodiment illustrated in FIG. 3, then the seat is replaced. The pads extend laterally beyond the edge of the seat, once the seat is remounted over the saddle.

In some embodiments, a non-slip material 603 is added over the foam pads, and may be held in place by an adhesive. In some embodiments, the surface of the pads may be molded to provide a non-slip surface. This arrangement allows a rider to exert inward force on the pads to control the rider's motion forward or backward on the seat, which may allow the rider to exert less force on the handlebar mechanism than would be necessary in the absence of the control-pads.

In some embodiments of the invention illustrated generally by FIG. 6, the thickness of the pads may not be uniform. For example, the pad thickness may be greater at the forward and rearward extremity, and less thick in the middle, where the rider would grip with the legs. This variation allows the riders knees or legs to enter a pocket of the pads, where the rider's knees or legs will have thicker pad material in front and behind. This provides better grip and control of movement of the rider relative to the pads, hence relative to the motorcycle.

FIG. 7a is a perspective view of a motorcycle seat with control pads provided as an integral part of the seat. FIG. 7b is a top plan view of the seat of FIG. 7a. Forward control pads 702 and rear control pads 701 extend outward from each side of the seat, and provide restraint for a rider's legs, in the manner described above for other embodiments of the invention. In some embodiments control pads 701 and 702 may be molded into the seat in manufacture. In some embodiments, the control pads may be added to an existing seat be sewing, adhesive, or other attachment means, or a combination if attachment means. In another embodiment, the control pads may be fashioned as a unit that may be wrapped over the existing seat and stapled or otherwise fastened to the bottom of the seat frame. Control pads may be added to a motorcycle in this embodiment by removing an existing seat, and replacing the removed seat with a seat having control pads according to the embodiments illustrated by FIGS. 7a and 7b.

FIG. 7c is a top plan view of a motorcycle seat in another embodiment of the present invention. In the example illustrated by FIG. 7c, pads 704 of the sort illustrated and described above with reference to FIG. 6 are provided along the sides of seat 703. These are foam or rubber-like pads having a thickness of from one-quarter to perhaps an inch or more, and may vary in resilience. With such pads along the sides a rider may grip the seat securely with the legs, and gain the advantage provided in other embodiments by having the legs between forward and rearward pads. The pads may be molded into the seat at manufacture, or added by a conventional attachment means, such as by adhesive or sewing. In some embodiments, the pads may vary in thickness as described in the example above with reference to FIG. 6. As in the embodiment with reference to FIG. 6 the pads may be surfaced with a non-slip surface, either by addition of a surface layer, or by molding into the surface of the pads.

FIG. 8a is a perspective view of a pair of motorcycle riding boots 800 with control-pads 801 added. The Control-pads may vary in shape, thickness, density and color to suit the needs of the rider. In one embodiment control pads 800 are formed of foam or rubber-like material, and have a thickness allowing a rider to compress the pads with the knees or legs. The pads may be round, as shown, but may be of different shapes in other embodiments. The control pads may also have anon-slip surface as previously described for other control pads in embodiments of the invention. In some embodiments, the control pads may have a concave or a convex shape, and in some embodiments may have indentions to interface with one or more elements on a side of a motorcycle.

In one embodiment control pads 801 are attached to the tops of the boots by such as stitching or stapling, and in place on the boots are adjacent to a rider's knees, where the rider may exert force on the pads against a portion of a motorcycle.

FIG. 8b illustrates a pair of control units 802 having control pads 801. The downward extension of the unit below the pad provides a tongue that may be inserted into a conventional riding boot, to provide control pads that may then be used just as the control pads that are sewn or stitched to boots may be used.

FIG. 8c is a front elevation view of the boots 800 of FIG. 8a, showing pads 801 in place, which may be either the attached embodiment of the inserted embodiment.

Figure 9:
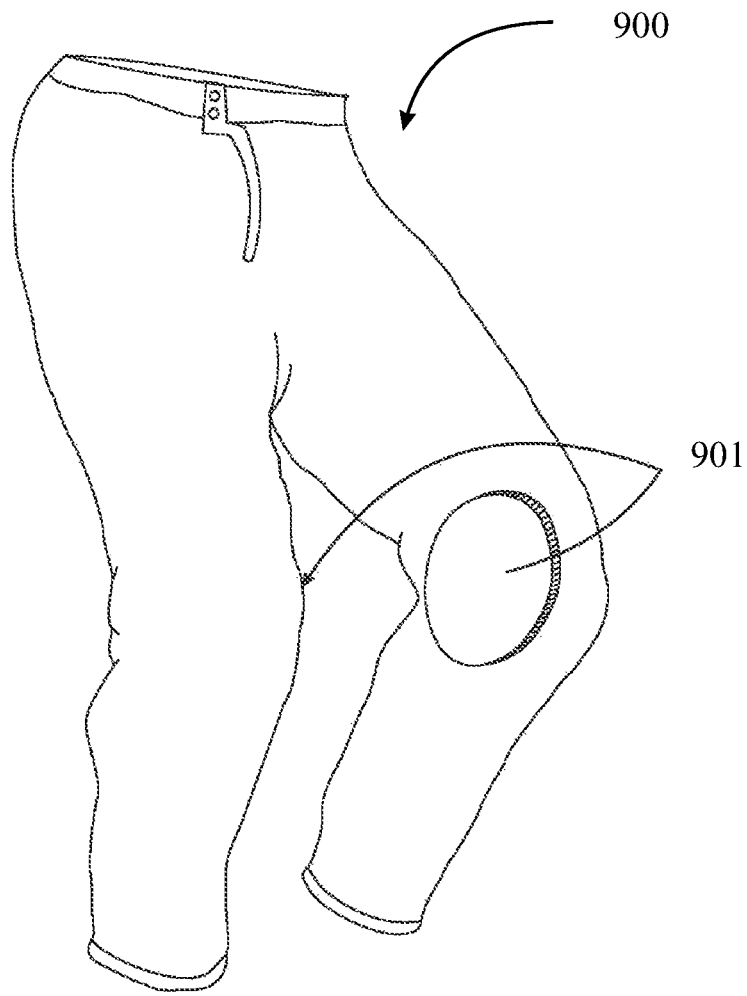
FIG. 9 is a perspective view of motorcycle riding pants with control pads in an embodiment of the invention.

FIG. 9 is a perspective view of motorcycle riding pants 900 in an embodiment of the invention. In this embodiment control pads 901 added to the inseam on the inside of each knee. The control pads can be manufactured into the pants or the pants can be manufactured with pockets that may hold various types of pads next to the inner knee of the rider. The control pads may vary in shape, thickness, density and color to suit the needs of the rider. The friction properties of the Control-pads surface may also vary to accommodate the needs of the rider. The Control-pads can be foam pads or material with a non-slip exterior or a pad covered with a non-slip material. A rider will have the legs on each side of the motorcycle and use pads 901 to grip the motorcycle in a manner that the rider's legs may be constrained, allowing the rider to exert force on the pads by the rider's legs to control motion forward or backward on the motorcycle, which may allow the rider to exert less force on the handlebar mechanism than would be necessary in the absence of the added control-pads.

It should be apparent to the skilled person that there are a great many changes that may be made in the embodiments described above as examples, within the scope of the invention. For example, the description of the forward control-pads as bars and the rearward control pads as round pucks is not limiting, but exemplary. In some cases the forward and rear control-pads may be each a plurality of elements to constrain the rider's legs and provide the rider with additional levels of control of the motorcycle, by affording the rider an ability to control his or her forward and rearward motion and momentum during incidents of acceleration and deceleration. The control-pads might be formed to the shape of the rider's legs both fore and aft, for example. The number and shape of the control-pads may vary greatly, as long as the constraint is provided.

The invention claimed is:

1. A control pad system for a motorcycle, comprising:
   a substantially U-shaped saddle-like unit having a substantially planar, horizontally-disposed upper portion adapted to lie over and engage a frame of a motorcycle beneath a seat of the motorcycle, with downward-extending first and second opposite side portions, disposed on each side of the motorcycle frame with the upper portion engaged to the motorcycle frame; and
   two control pads fashioned from resilient rubber-like material, each having a length, a height and a thickness, one each of the control pads mounted to each of the first and second opposite side portions, such that an outer surface of each control pad is presented outwardly from the motorcycle frame on each side portion;
   wherein the control pads are positioned in a manner to enable the rider to grip the control pads between the knees, constraining the rider's position forward and rearward on the motorcycle.

2. The control pad system of claim 1 wherein the outer surfaces of the control pads present a non-slip surface.

3. The control pad system of claim 2 wherein the non-slip surface is an added layer to the outer surfaces of the control pads.

4. The control panel system of claim 3 wherein the added layer is mounted to the outer surfaces with an adhesive.

5. The control pads system of claim 1 wherein the thickness of the control pads is uniform.

6. The control pad system of claim 1 wherein the thickness of the control pads varies, being thicker in a forward and rearward region, and thinner in a central area.

7. The control pad system of claim 1 wherein the thickness of the control pads varies in a manner to present a depression in the shape of the inside of the rider's knees.

8. The control pad system of claim 1 wherein the horizontally-disposed upper portion comprises one or more openings to accommodate fasteners to constrain the saddle-like unit to the motorcycle frame.

* * * * *